Dec. 13, 1932.  P. J. FOBERT  1,890,848
BEARING DIVIDING MACHINE
Filed Jan. 16, 1930   2 Sheets-Sheet 1

INVENTOR
Phillip J. Fobert.
BY
Stuart C. Barnes
ATTORNEY

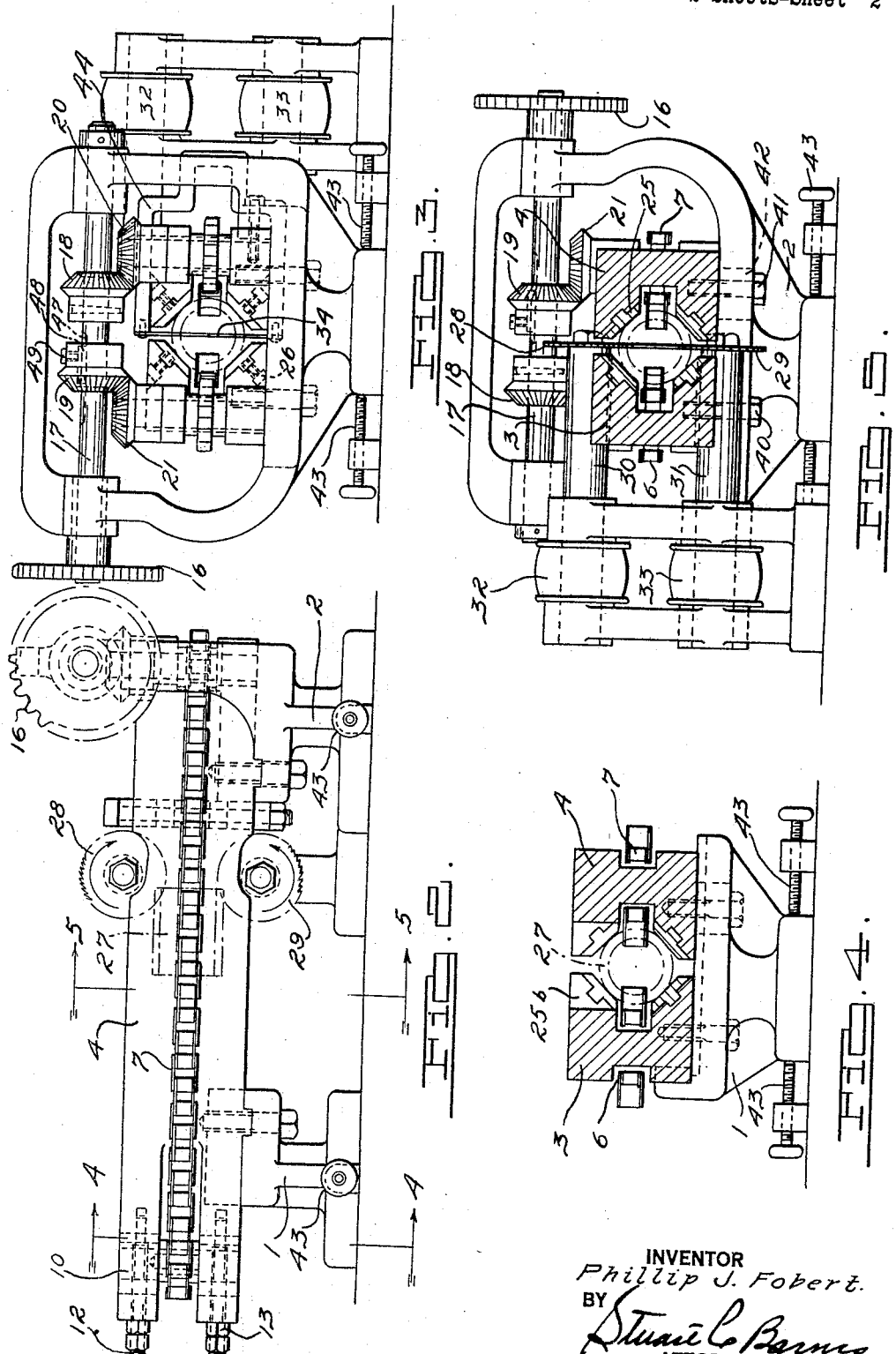

Patented Dec. 13, 1932

1,890,848

UNITED STATES PATENT OFFICE

PHILLIP J. FOBERT, OF DETROIT, MICHIGAN, ASSIGNOR TO DETROIT ALUMINUM & BRASS COMPANY, OF DETROIT, MICHIGAN, A CORPORATION OF MICHIGAN

BEARING DIVIDING MACHINE

Application filed January 16, 1930. Serial No. 421,322.

This invention has to do with a machine employed in the manufacture of bearings. In the making of bearings, a sleeve or tube, usually of bronze, is provided with an interior surface of babbitt. This sleeve or tube is then split or sawed lengthwise, forming two halves, and these halves are employed as bearings for shafts, as for a crankshaft of an engine.

The invention is directed particularly to the provision of a machine for sawing the tubular members in two. It has been one practice to mount the tubular construction on an arbor, split or provided with a kerf for the reception of a saw which severs the bearing in two parts. It has also been proposed to provide double saws for use with such an arbor, for sawing opposed walls. Devices of this kind, however, require considerable time, because an employee must necessarily securely fix each bearing to be sawed on the arbor. Moreover, considerable skill on the part of an operator is necessary.

The present invention contemplates a machine by means of which the tubular bearing structures may be severed into halves at a much higher rate of speed than has been possible heretofore. Moreover, the machine is of a nature which permits the use of relatively unskilled labor, as it is but necessary for the operator to place the bearing in the machine, and this having been done, the same is severed properly in an automatic manner.

In the accompanying drawings:

Fig. 2 is a side elevation thereof.

Fig. 3 is an end view looking from the right hand end of Fig. 1.

Fig. 4 is a sectional view taken on line 4—4 of Fig. 2.

Fig. 5 is a section taken on line 5—5 of Fig. 2.

Figure 1:
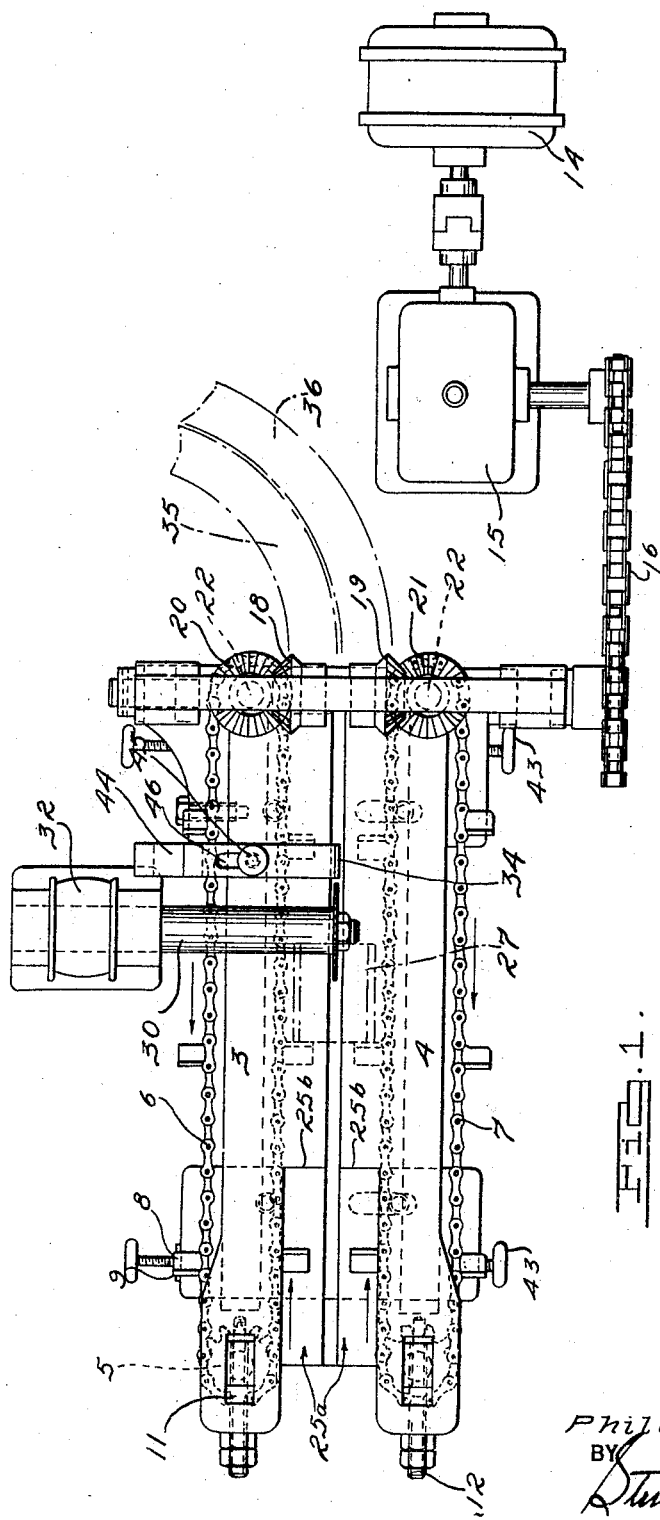
Fig. 1 is a top plan view of a machine constructed in accordance with the invention.

The machine comprises essentially guide devices through which bearings are successively moved, together with movable elements for moving the bearings therethrough, and as the bearings move they are severed. There is a suitable standard 1, and another standard 2, which support the ends of frame members 3 and 4. The standards may be supported at a suitable elevation by means of a suitable table or the like. The frame members 3 and 4 may be relatively heavy blocks of steel as shown, and journaled at the end of each frame member is a sprocket 5. Over these sprockets, run endless chains 6 and 7, and these chains are equipped with studs 8, designed to engage and move before them, the cylindrical bearing to be sawed. These studs are arranged in pairs. The chains are driven in unison by means presently to be described, and are preferably provided with relatively soft facing material 9, such as bronze, for direct engagement with the bearings. The sprockets at one end of the machine are mounted on journals capable of adjustment so that the chains can be adjusted, and held taut. Different means can be provided for this purpose, and as shown, each spindle 10 is mounted in slot 11, and held against the taut chain by rods 12 provided with nuts 13.

The chains are power driven in unison, and for this purpose a suitable motor 14 is provided, working through a gear reduction box 15, operating drive chain 16 which runs over a sprocket on shaft 17; on this shaft are a pair of pinions 18 and 19 meshing with pinions 20 and 21 mounted on the journals 22 of the rear chain sprockets. Accordingly, it will be seen that the chains are driven in unison and in the direction indicated by the arrows of Fig. 1.

Each member 3 and 4 is provided with guide devices for the guiding of bearings. These devices are afforded preferably by separate strips of steel or the like, each accurately machined and secured in to the frame members 3 and 4. These strips are illustrated at 25, and are held to their supporting means as by means of machine screws 26. The lowermost guiding devices extend forwardly of the machine as illustrated at 25a, while the uppermost strips terminate short of the end of parts 25a at about the location indicated by 25b (Fig. 1). This will be clear by reference to Figs. 1 and 4, wherein Fig. 4 shows the uppermost guiding devices in end elevation. Accordingly, a full cylindrical bearing element may be placed in the sort of pocket provided by this construction, and resting on the portions 25a of the lowermost guiding devices and, the chains 6 and 7, being in movement, a pair of plugs 8 engage the rear of the bearing element, and move it through the passageway defined by the several guiding strips. The manner in which a bearing is moved therethrough is illustrated by the dotted lines in Fig. 1, wherein the bearing element is referenced 27.

As the bearing moves through the machine, it is severed, and this is accomplished by a pair of saws 28 and 29, each mounted upon a shaft, as at 30 and 31. These shafts are suitably driven as by means of belts (not shown), running over pulleys on the shafts illustrated at 32 and 33. These saws are positioned in the centerline of the bearing element as it is guided in the machine. Positioned immediately to the rear of the saws is a divider 34 which enters the saw kerf and keeps the severed metal from approaching at the saw kerf to prevent binding action on the saws. This divider is especially useful where the bearings are long, but it may, or may not, be used with short bearings. At the outlet end of the machine the bearing parts are discharged and are deposited into suitable receptacles, and for this purpose a trough 35 may be provided having a partition 36 for the purpose of keeping the halves separate so that the halves may be maintained separate in suitable receptacles.

As shown in Figs. 3, 4, and 5, the bearings fit snugly in between the four guiding strips or surfaces. In this manner the bearing is snugly held in place during the sawing operation so that an accurate cut is provided. Obviously, all bearings are not of the same diameter, and the present invention provides means capable of adjustment in order to take care of various sized bearings, within of course, the limits which ordinarily are encountered. For this purpose the blocks 3 and 4 are adjustable toward and away from each other. The block 3 may be fixed immovable relative to the supporting standards as by means of bolts or machine screws 40. The block 4 is secured by machine screws 41 passing through elongated apertures 42 in the standard. This is the only adjustment necessary for the purpose of adjusting the guiding devices for different sized bearings, it being unnecessary to enlarge the guiding passageway vertically, as the surfaces of the guiding elements 25 are sufficiently large to permit the line contact between the cylindrical bearing element and the guiding surfaces to vary in position. It is, of course, necessary that the saws be on the center line when adjustment is made for diameter of the bearing. One-half of the machine is moved with respect to the other; this throws the saws off center. The support 1 may now be adjusted with respect to its table or work bench to bring the center line back to the location of the saws. This adjustment may be accomplished by suitable means, as for example, screw-threaded positioning bolts 43 which engage opposite sides of the support 1. Also, it will be necessary to adjust the divider or separator to the centerline and for this purpose the separator is mounted on a supporting bracket 44, which in turn is carried by frame member 3, as by means of machine screw 45 taken through an elongated opening 46, in the bracket.

These adjustments, as shown herein, are not of the type embodying gaged movements wherein the position is readily made and indicated by a scale on the machine or the like, but they are adjustments which are to be made with the use of suitable gaging tools, so that the set-up of the machine is extremely accurate. It is within the invention, however, to provide any sort of adjusting devices. Moreover, the particular structural details of the machine may vary from that shown herein, and it is intended that the appended claims cover all equivalents of machine construction.

Also, it will be observed that when the block 4 is adjusted on the standards that this effects adjustment of one entire side of the machine, including the chain attached thereto, and its sprockets. It follows that the pinion 21 and pinion 19 must be capable also of adjustment. For this purpose the shaft 17 is provided with a keyway 47 receiving a key 48, held in place by a machine screw 49. This screw may be loosened, to permit pinion 19 to be shifted on the shaft 17 and tightened to clamp the key in the keyway to prevent its movement in normal operation.

I claim:

1. A machine for severing cylindrical bearing members into halves, comprising guide elements presenting four plane guide surfaces disposed at angles of substantially ninety degrees and defining a passageway for the bearing members which is substantially a parallelogram in cross section, means for engaging cylindrical bearing members and for moving same through the passageway with the bearing members substantially contacting with the four guide surfaces, cutting means projecting into the passageway for cutting the members into halves, at least two of said plane guide surfaces being associated with each other and means for adjusting them in unison toward and away from the other two guide surfaces for altering the parallelogram cross-sectional shape of the passageway for bearings of different diameters.

2. A machine for severing cylindrical bearing members into halves comprising a supporting member having two plane guide surfaces, another supporting member with two plane guide surfaces facing the guide surfaces of the first supporting member, said guide surfaces cooperating to define a substantially closed passageway, an endless chain carried by each supporting member, means for moving the chain, means on the chains for engaging cylindrical bearing members and passing them through the passageway, cutting instruments projecting into the passageway, said plane guide surfaces being adapted to engage the bearing members as they pass through the passageway to accurately hold the same and means for carrying the supporting members so that they may be adjusted relatively toward and away from each other for positioning the guide surfaces for accommodating bearing members of different diameters.

In testimony whereof I affix my signature.

PHILLIP J. FOBERT.